United States Patent
Vong et al.

(10) Patent No.: US 12,430,831 B2
(45) Date of Patent: Sep. 30, 2025

(54) SYSTEMS AND METHODS FOR APPLYING EFFECTS TO DESIGN ELEMENTS

(71) Applicant: Canva Pty Ltd, Surry Hills (AU)

(72) Inventors: Declan Robin Vong, Sydney (AU); Matthew David Anderson, Sydney (AU); Lynneal Jia Santos, Sydney (AU); Jesse James Walker, Petersham (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/231,702

(22) Filed: Aug. 8, 2023

(65) Prior Publication Data

US 2023/0386110 A1    Nov. 30, 2023

Related U.S. Application Data

(63) Continuation of application No. 17/687,655, filed on Mar. 6, 2022, now Pat. No. 11,763,505, which is a continuation of application No. 17/233,693, filed on Apr. 19, 2021, now Pat. No. 11,302,050.

(30) Foreign Application Priority Data

Apr. 21, 2020 (AU) ................................ 2020901256

(51) Int. Cl.
    *G06T 11/60*     (2006.01)

(52) U.S. Cl.
    CPC .................................. *G06T 11/60* (2013.01)

(58) Field of Classification Search
    CPC ......... G06T 11/40; G06T 11/60; G06T 15/60; G06T 15/80; G06F 40/10; G06F 3/0481
    See application file for complete search history.

(56) References Cited

U.S. PATENT DOCUMENTS

| | | |
|---|---|---|
| 8,230,358 B1 | 7/2012 | Chaudhri |
| 9,576,393 B1 * | 2/2017 | Bethel ................ G06F 3/04815 |
| 2009/0313567 A1 | 12/2009 | Kwon et al. |
| 2014/0111534 A1 | 4/2014 | Niles et al. |
| 2014/0218364 A1 | 8/2014 | Collins et al. |
| 2015/0035821 A1 | 2/2015 | Andriotis et al. |
| 2015/0091934 A1 | 4/2015 | Jung et al. |
| 2015/0109299 A1 * | 4/2015 | Thimbleby ............ G06T 15/60 345/426 |
| 2015/0293672 A1 * | 10/2015 | Crotty .................... G06T 11/60 715/833 |
| 2015/0379750 A1 | 12/2015 | Masuko |

(Continued)

FOREIGN PATENT DOCUMENTS

| | | | |
|---|---|---|---|
| CN | 107111427 A * | 8/2017 | ......... G06F 3/04845 |
| CN | 107943964 A | 4/2018 | |

(Continued)

*Primary Examiner* — Chante E Harrison
(74) *Attorney, Agent, or Firm* — GrowIP Law Group LLC

(57) ABSTRACT

Described herein is a computer implemented method. The method includes detecting user input activating a text effect selection control. In response to the user input the method further includes automatically determining a selected design element, the selected design element being a text element displayed on a page; applying a stroke to the selected design element; setting a fill of the selected design element to be transparent; and generating and displaying a shadow for the selected design element.

20 Claims, 5 Drawing Sheets

(56) References Cited

U.S. PATENT DOCUMENTS

| | | |
|---|---|---|
| 2019/0057255 A1 | 2/2019 | Kuo et al. |
| 2019/0279409 A1 | 9/2019 | Kim et al. |
| 2019/0311528 A1 | 10/2019 | Harrington et al. |
| 2020/0005502 A1* | 1/2020 | Sheffer ................. G06T 11/203 |
| 2020/0159871 A1* | 5/2020 | Bowen ................... G06T 11/60 |
| 2020/0242823 A1* | 7/2020 | Gehlaut ................. G06T 11/40 |
| 2021/0124796 A1 | 4/2021 | Singh et al. |
| 2021/0258511 A1 | 8/2021 | Goodrich et al. |
| 2021/0407155 A1* | 12/2021 | Martin ................. G06T 11/206 |

FOREIGN PATENT DOCUMENTS

| | | | |
|---|---|---|---|
| CN | 111311724 B | 6/2020 | |
| CN | 112329384 A | 2/2021 | |
| CN | 112329385 A | 2/2021 | |
| WO | WO-2012021313 A1 * | 2/2012 | ......... G06F 3/04847 |

* cited by examiner

SYSTEMS AND METHODS FOR APPLYING EFFECTS TO DESIGN ELEMENTS

CROSS-REFERENCE TO RELATED APPLICATIONS

This application is a continuation of U.S. Non-Provisional application Ser. No. 17/687,655, filed on Mar. 6, 2022, that is a continuation of U.S. Non-Provisional application Ser. No. 17/233,693, filed on Apr. 19, 2021, that claims the benefit of the filing date of Australian Patent Application No. 2020901256, filed on Apr. 21, 2020, which are all hereby incorporated by reference in their entirety.

FIELD

The present disclosure is directed to systems and methods for applying effects to design elements.

BACKGROUND

Various computer implemented tools for creating and publishing designs or other visual content exist. Generally speaking, such tools allow users to create (for example) a page and then add design elements to that page.

Typically, a given design tool provides a vast array of different types of design elements that can be added to a page—either by being created from scratch by a user or being accessed from an element library (e.g. a library of shapes or other graphics). Furthermore, for any given element there will often be numerous attributes and parameters that can be adjusted in order to change the element's appearance one way of another.

By way of example, even a simple element such as a geometric shape has a large number of parameters that can be adjusted. A small—but by no means complete—selection of common shape attributes includes attributes such as: position, width, height, element depth (whether the element occludes other elements or is occluded by other elements), flipped in a x-direction, flipped in a y-direction, line colour, line weight, line type, line transparency, corner radius, fill colour (solid or gradient), fill pattern, fill transparency.

Providing a large number of element types and, for each element type, various adjustable parameters is in many cases advantageous as it allows users to create complex and intricate designs. It can, however, introduce disadvantages. For example, within a large number options available a user may either not that a particular element adjustment is possible. Even if the user is aware of the various element parameters, they may not be able to use the parameters to achieve a desired effect, or make a desired effect aesthetically pleasing.

Even if a user can create a desired effect, doing so—and doing so in a way that creates the desired effect so it is aesthetically pleasing—may be time consuming and inefficient: both from the user's perspective and a computational perspective.

Background information described in this specification is background information known to the inventors. Reference to this information as background information is not an acknowledgment or suggestion that this background information is prior art or is common general knowledge to a person of ordinary skill in the art.

SUMMARY

In one aspect, the present invention provides a computer implemented method comprising: displaying a text effect selection control; detecting a first user input activating the text effect selection control; and in response to the first user input: determining a selected design element, the selected design element being a text element displayed on a page; automatically generating a first shadow for the selected design element, the first shadow having a first colour, a first direction, a first offset, and a first opacity; automatically generating a second shadow for the selected design element, the second shadow having the first colour, the first direction, a second offset, and a second opacity, wherein the second offset is greater than the first offset and the second opacity is less than the first opacity; and displaying first shadow and the second shadow behind the selected design element.

In a second aspect, the present invention provides: a computer processing system comprising: a processing unit; a display; and non-transient computer-readable storage medium storing instructions, which when executed by the processing unit, cause the processing unit to: display, on the display, a text effect selection control; detect a first user input activating the text effect selection control; and in response to the first user input: determine a selected design element, the selected design element being a text element displayed on a page; automatically generate a first shadow for the selected design element, the first shadow having a first colour, a first direction, a first offset, and a first opacity; automatically generate a second shadow for the selected design element, the second shadow having the first colour, the first direction, a second offset, and a second opacity, wherein the second offset is greater than the first offset and the second opacity is less than the first opacity; and display the first shadow and the second shadow behind the selected design element.

Figure 1:
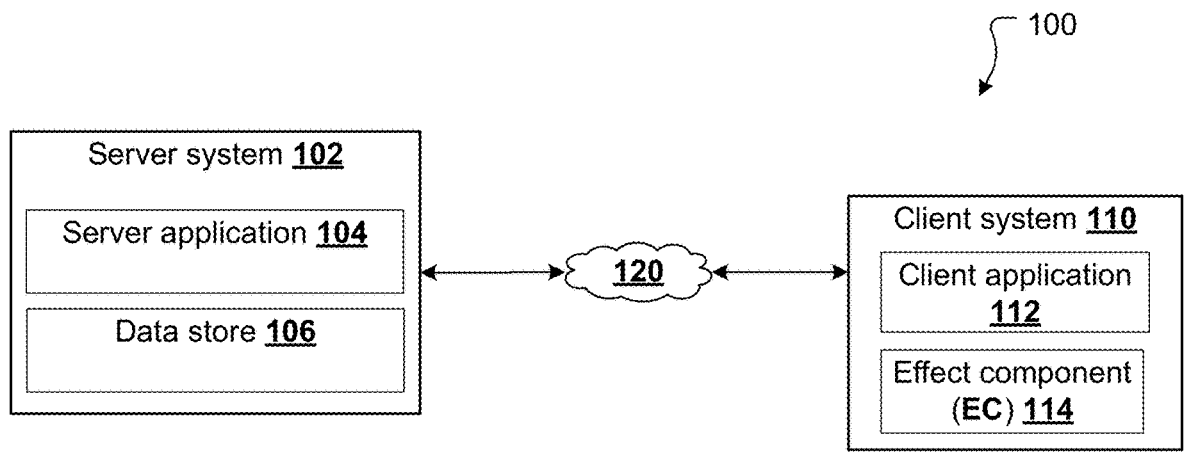
FIG. 1 is a block diagram illustrating an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many tools for creating and publishing visual content exist. The present disclosure generally focuses on applying effects to design elements. The effects described herein are particularly suitable for text elements, and accordingly are described with respect thereto. The processing described can, however, be applied (or be adapted to be applied) to other types of design elements.

Initially, a networked environment and computer processing system in which features of the present disclosure can be implemented will be described. An example user interface for creating a design is described, followed by processing involved in applying and adjusting effects to selected design elements.

By way of example, FIG. 1 depicts a networked environment 100 in which the various operations and techniques described herein can be performed.

Networked environment 100 includes a server system 102 and a client system 110 that are interconnected via a communications network 120 (e.g. the Internet). While a single client system 110 is illustrated and described, server system 102 will typically serve multiple client systems.

The server system 102 includes various functional components which operate together to provide server side functionality.

One component of server system 102 is a front-end server application 104. The server application 104 is executed by a computer processing system to configure the server system 102 to provide server-side functionality to one or more corresponding client applications (e.g. client application 112 described below). The server-side functionality includes operations such as user account management, login, and content creation functions—for example creating, saving, publishing, sharing content.

To provide the server-side functionality, the server application 104 comprises one or more application programs, libraries, APIs or other software elements. For example, where the client application 112 is a web browser, the server application 104 will be a web server such as Apache, IIS, nginx, GWS, or an alternative web server. Where the client application 112 is a specific application, the server application 104 will be an application server configured specifically to interact with that client application 112. Server system 102 may be provided with both web server and application server modules.

In the present example, server system 102 also includes a data store 106 which is used to store various data required by the server system 102 in the course of its operations. Such data may include, for example, user account data, design template data, design element data, and data in respect of designs that have been created by users. While one data store 106 is depicted, server system 102 may include/make use of multiple separate data stores—e.g. a user data store (storing user account details), one or more design element library data stores (storing design elements such as graphics that users can add to designs being created); a template data store (storing templates that users can use to create designs); a design data store (storing data in respect of designs that have been created); and/or other data stores.

In order to provide server side functionality to clients, server system 102 will typically include additional functional components to those illustrated and described. As one example, server system 102 will typically include one or more firewalls (and/or other network security components) and load balancers (for managing access to the server application 104).

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 104 may run on a single dedicated server computer and data store 106 may run on a separate computer (with access to appropriate data storage resources). As an alternative example, server system 102 may be a cloud computing system and configured to commission/decommission resources based on user demand 104. In this case there may be multiple server computers (nodes) running multiple server applications 104 which service clients via a load balancer.

A single server system 102 has been shown in example environment 100. In certain embodiments, additional server systems may be accessible to a client system 110 (and/or server system 102)—for example third party content servers which the client and server systems can access to obtain design elements that can be added to designs.

Client system 110 hosts a client application 112 which, when executed by the client system 110, configures the client system 110 to provide client-side functionality for/ interact with the server application 104 of the server system 102. Via the client application 112, users can interact with the server application 104 in order to perform various operations such as creating, editing, saving, retrieving/accessing, publishing, and sharing designs.

Client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

In the present example, client system 102 also includes an effect component 114 (EC 114 for short). In the embodiments described below, the effect component 114 performs (or configures the client application 112 to perform) processing associated with applying and adjusting effects to design elements.

EC 114 may be software module such as an add-on or plug-in that operates in conjunction with the client application 112 to expand the functionality thereof. In alternative embodiments, the functionality provided by the EC 114 may be natively provided by the client application 112 (i.e. the client application 112 itself has instructions and data which, when executed, cause the client application 112 to perform part or all of the effects functionality described herein). In still further alternative embodiments, the EC 114 may be a stand-alone application which communicates with the client application 112.

Client system 110 may be any computer processing system which is configured (or configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application such as a Microsoft Windows operating system, an Apple macOS operating system, an Apple iOS operating system, an Android operating system, a Unix or Linux operating system, or an alternative operating system.

The architecture described above and illustrated in FIG. 1 is provided by way of example only. Many variations are possible.

For example, while the EC 114 has been described and illustrated as being part of/installed at the client system 110, the functionality provided by the EC 114 could alternatively be provided a server system such as 102, for example as an add-on or extension to server application 104, a separate, stand-alone server application that communicates with server application 104, or a native part of server application 104.

Further alternatively, the functionality provided by the EC 114 could be performed by a client application (e.g. 112) and server application (e.g. 104) operating in conjunction.

As a further alternative, the functionality provided by the EC 114 could be provided as an entirely separate service—e.g. running on a separate server system to server system 102 and communicating with client application 112 (and/or server system 102) as required to perform the effects functionality described herein.

Furthermore, while a client-server architecture has been described, a content creation system including an EC 114 (or otherwise configured to perform the processing described herein) could be provided in a self-contained application that is installed and runs solely on a client system such as 110 without any need of a server application.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
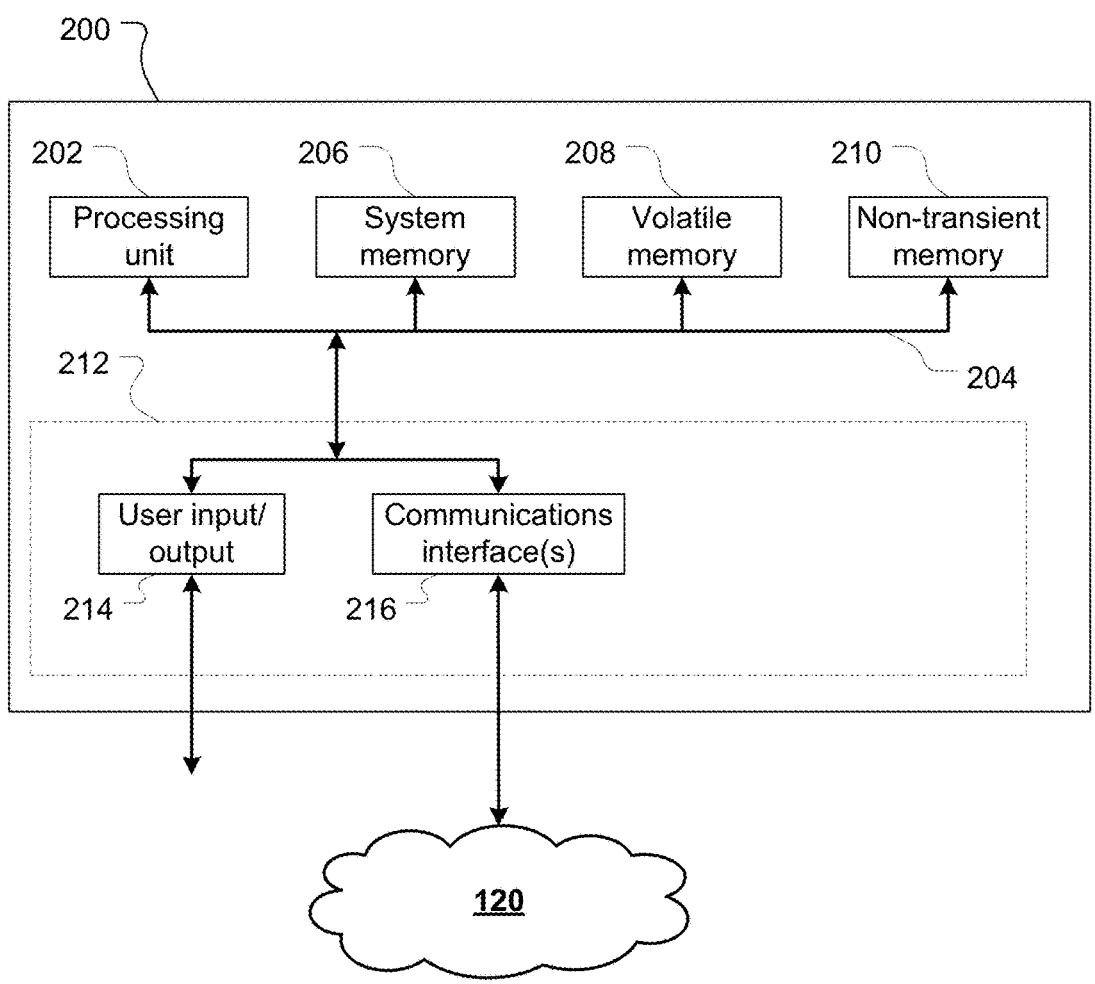
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 120 of environment 100 (and/or a local network within the server system 102). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over an interface such as 214 or 216.

As described above, applications accessible to system 200 will typically include an operating system application.

System 200 also stores or has access to applications which, when executed by the processing unit 202, configure system 200 to perform various computer-implemented processing operations described herein. For example, and referring to the networked environment of FIG. 1 above: client system 110 includes a client application 112 which (with effect component 114) configures the client system 110 to perform the operations described herein.

In some cases, part or all of a given computer-implemented method will be performed by system 200 itself, while in other cases processing may be performed by other devices in data communication with system 200.

Figure 3:
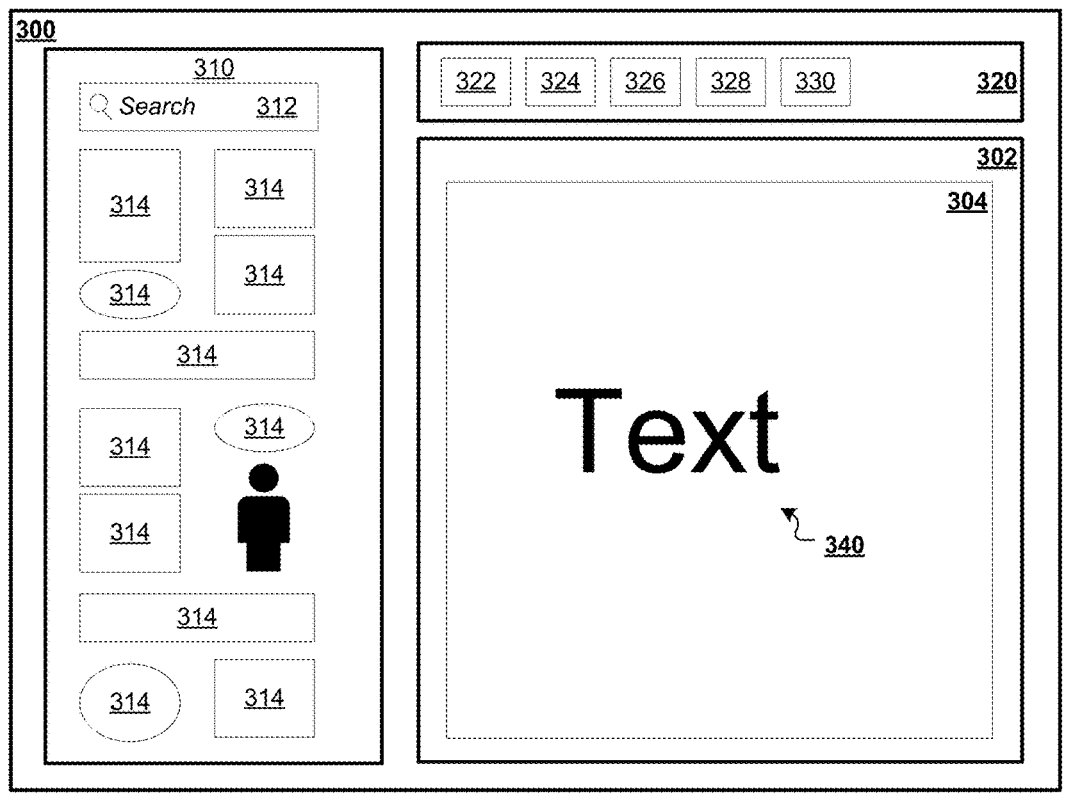
FIG. 3 provides an example design creation user interface.

As described above, the present disclosure is generally concerned with applying effects to design elements, and in particular to text design elements. Referring to FIG. 3, a general overview is provided of an example user interface 300 by which a user can create a design, add design elements (such as text elements) to that design, cause effects to be applied to/removed from design elements, and adjust effects applied to design elements.

It should be noted, however, that particular manner in which a design is created and/or design elements are added to a design are not of specific relevance to this disclosure, and many alternative ways of doing so exist.

User interface 300 is displayed by a client system 102 (the client system 102 configured to do so by client application 104).

Via interface 300 a user can create a design document that comprises one or more pages and (inter alia) add design elements to those pages. Example design creation interface 300 includes a design creation pane 302 in which the design currently being worked on is displayed. In the present example, design creation pane 302 shows a single page 304 of a design document.

Design creation interface 300 also includes a design element search and selection pane 310 via which a user can search or browse one or more design element libraries, view design element previews 314, and select design elements to be included in the design document. To this end, pane 310 includes a search box 312 (allowing a user to enter search text) and design element previews 314 providing preview images of design elements. The search functionality may cause the client application 112 to search local memory of the client system 110 for design elements, server system 120 memory for design elements, and or third party server systems (not shown) for design elements.

Design elements previewed in the search and selection pane 310 can be added to the design being worked on (e.g. to page 304), for example by dragging and dropping, double-clicking, dwelling, or any other appropriate user interaction.

Design creation interface 300 also includes a toolbar 320 providing various tools for design creation and editing. In this particular example the tools include: a design element selection tool 322 allowing a user to select a particular design element that has been added to the page 304; a drawing tool 324 allowing a user to draw a design element having a geometric or other shape; a text tool 326 allowing a user to add a text element; an import tool 328 allowing a user to import a design element from another source (e.g. a design element stored on locally or remotely accessible memory, a design element from a third party server, etc.).

While not shown, toolbar 320 will typically be an adaptive toolbar in that the tools provided change depending on what the user is doing. For example, if a user selects the text tool 326, additional (or alternative) tools relevant to text may be displayed: e.g. a font selection tool, a font size tool, a font colour tool etc.

In the present example, toolbar 320 also includes an effects control 330, activation of which (in this particular example) causes an effect interface to be displayed. An example effect interface 400 is described below with reference to FIGS. 4 and 5.

Generally speaking, in order to create a design a user creates a page and adds design elements to that page. Design elements can be added in various ways. For example, a user can interact with the design element search and selection pane 310 to search/browse for design elements and then add design elements to the design being created—e.g. by selecting a design element preview 314, dragging it to a position on the page 304, and dropping it. Alternatively, a user may create and add an entirely new design element—e.g. by drawing a design element using a tool such as drawing tool 324 or adding custom text via text tool 326. Further alternatively, a user may import a design element via import tool 328.

In this specific example, page 304 includes a single design element 340. The example design element 340 is a text element with the letters/glyphs 'Text'. Text element 340 may be generated, for example, by user activation of an add text control (such as control 326), user selection of a position on the page 304 (e.g. by clicking or contacting that position), and user entry of the letters 'T', 'e', 'x', and (e.g. via a physical or GUI keyboard).

Interface 300 is provided by way of example only, and alternative user interfaces (with alternative user interface elements and controls) are possible.

Figure 4:
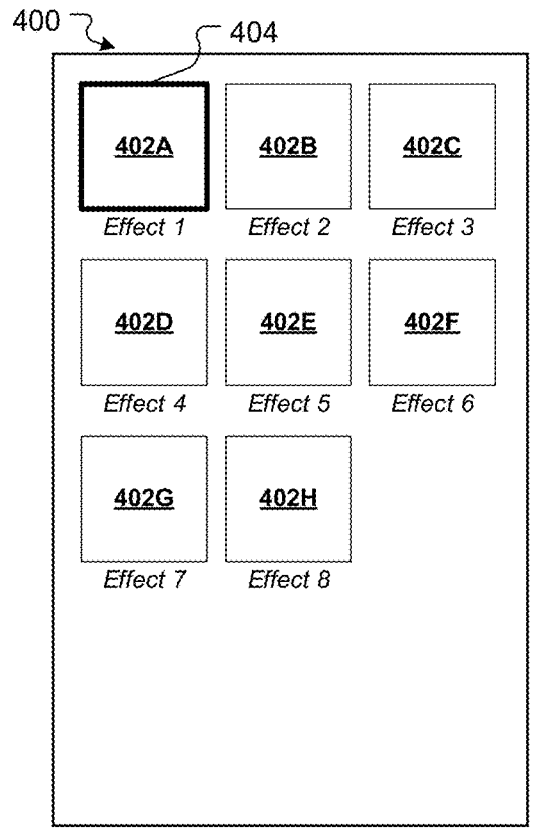
FIGS. 4, 5, and 6 provide example effect interfaces.

Turning to FIG. 4, an example effect interface 400 will be described.

Effect interface 400 of the present example includes a plurality of effect selection controls 402. Each effect selection control 402 includes an effect selection control icon and an effect selection control label.

In the present example, effect interface 400 includes eight effect selection controls: control 402A (with label 'Effect 1'), control 402B (with label 'Effect 2'), control 402C (with label 'Effect 3'), control 402D (with label 'Effect 4'), control 402E (with label 'Effect 5'), control 402F (with label 'Effect 6'), control 402G (with label 'Effect 7'), and control 402H (with label 'Effect 8'). Fewer or additional effect selection controls could be provided.

Each effect selection control 402 is associated with a particular effect. For a given effect selection control 402, the control's icon can be used to provide a visual example of the effect that the control is associated with and the control's label can be used to provide (see, for example, FIGS. 8 to 11 and 13) and a name (and/or description) of the effect that the control is associated with.

Via the effect interface 400, a user can apply a particular effect to a selected design element or group of design elements. For example, a user may select one or more elements that have been added to the design (e.g. by clicking or contacting them on the page 304) and then activate a particular effect selection control 402 by clicking or contacting on (or proximate) the control 402. As described below, this causes the EC 114 to apply the effect associated with the activated control 402 to the selected design element(s).

In effect interface 400, an active effect selection control 402 (i.e. one that has been activated) is visually distinguished over an inactive effect selection control 402. In interface 400 an active effect selection control (e.g. 402A) is indicated by having a heavier weight bounding box 404 around the control's icon.

Alternative mechanisms can be used to distinguish an active effect selection control from an inactive effect selection control. For example, active effect selection controls may be displayed in colour and inactive controls in black & white/grey scale. Alternatively, an active effect selection control may be visually distinguished by use of one or more of: particular colours, particular line styles, particular text, particular graphic, or an alternative visual distinction.

In the present example, effect selection control 402A is a 'no effect' control—i.e. a control that, when activated, removes any effect that was previously applied to a selected element (or group of elements). The EC 114 may be configured so that a 'no effect' control such as this is the control activated by default when the effect interface 400 is initially displayed (e.g. on activation of a selection control 330). Furthermore, in the present embodiments each effect is distinct and only a single effect can be active at any given time. Accordingly, when a particular effect selection control is activated the previously activated effect (and effect selection control) is deactivated.

Certain effects may be associated with one or more user adjustable parameters. In the present example, selection of a control 402 associated with such an effect causes one or more parameter adjustment controls to be displayed (and, if required, the layout of effect interface 400 to be adjusted to allow this).

Figure 5:
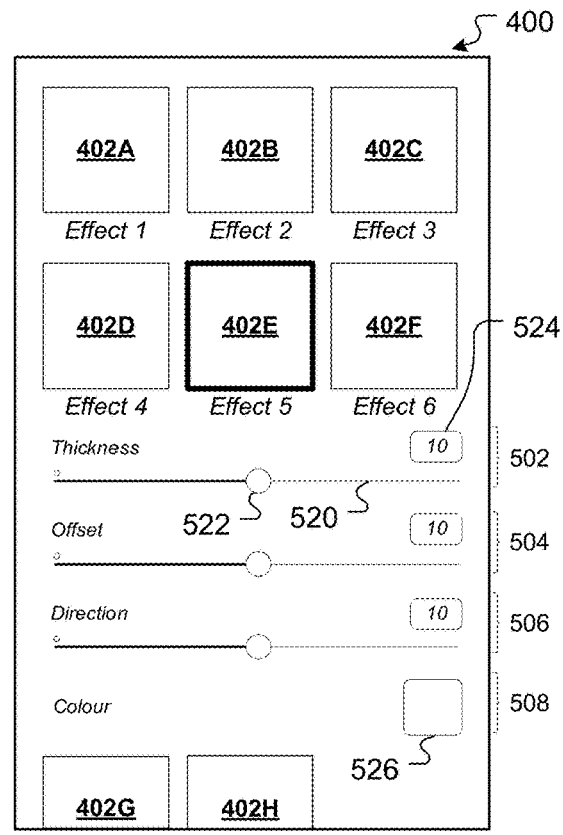

An example of this is shown in FIG. 5, which depicts interface 400 after detection of user input activating effect control 402E. As can be seen, activation of effect control 402E has caused deactivation of control 402A and control 402E to be visually distinguished (in this case via a heaver line bounding box) over the other effect selection controls.

In this example, effect selection control 402E is associated with an effect that has four user adjustable parameters. Accordingly, activation of control 402E has caused four parameter controls 502, 504, 506, and 508 to be displayed below the activated effect selection control 402E.

In this example, each parameter control 502, 504, 506, and 508 includes a parameter control label (in this case 'Thickness', 'Offset', 'Direction', and 'Colour' respectively).

In this example, each of parameter controls 502, 504, and 506 is a numeric selection control allowing a user to adjust/select a value from within a range of values. Various user interface elements for selecting/entering a particular value are possible, however in this example the numeric selection controls are slider controls. Each slider control includes: a path 520, the ends of which indicate the upper and lower bounds of the parameter's value; a handle 522 which an by dragged along the path 520 to select a particular value; and a parameter value display 524 (displaying a value selected via the slider and/or allowing a numerical value to be directly entered).

In certain embodiments, the numeric values displayed for slider controls (e.g. in value display 524) are 'simplified' values that are calculated into actual parameter values. I.e. a given slider may allow adjustment between display values of 0 and 100 (inclusively)—or 0 to 10 or any other display values. The selected 'display' value is then converted into actual parameter values by the EC 114. As one example (provided below) for the 'lift' effect an 'intensity' parameter slider is provided. The intensity value slider can be provided with any display values (e.g. 0 to 100). In the example provided below, however, the value selected using the parameter slider is converted into an actual intensity value of between 0 and 1 (inclusive), which in turn is used to calculate a blur radius value of between 0.6 spx and 4.5 spx and an opacity value of between and 0.6 spx.

In this example, parameter control 508 is a colour control and includes a colour selector 526. Colour selector 526 can display a currently selected colour and be operable by a user to select an alternative colour, for example by causing a colour selection interface to be displayed by which a user can select a particular colour. In this case any appropriate colour selection interface may be provided, for example: a colour slider, providing a slide control operable by a user to select a colour; a colour wheel/palette/picker control, operable by a user to select a particular colour; a text entry field into which a colour can be entered (either as plain text, RGB value, or alternative colour definition); a colour picker tool (e.g. an eyedropper type tool) operable to select another colour displayed on the user's screen; or any other colour selection interface.

Alternative types of parameter controls may be provided.

In this example, activation of effect selection control 402E has also caused adjustment of other effect selection controls 402 in the user interface 400. Specifically, effect selection controls 402G and 402H have been shifted down to accommodate the parameter controls associated with the active effect selection control 402E.

In some implementations, an effect interface such as 400 will be displayed in response to activation of a particular user interface control (for example an effects control 330 of user interface 300). In this case, effect interface 400 may be displayed in various ways.

For example, effect interface 400 may replace display of the search and selection pane 310 of user interface 300. In this case, activation of a design element search control will cause the search and selection pane 310 to be redisplayed and the effect interface 400 to be hidden.

In alternative implementations, an effect interface such as 400 may be displayed as a floating interface which is displayed above other user interfaces elements and can be moved around by a user. In this case, the effects control 330 may be configured as a toggle control with successive activations causing an effect interface to be displayed and hidden.

In still further alternative implementations, an effect interface such as 400 may be permanently displayed (in which case an effects control 330 need not be provided).

Figure 6:
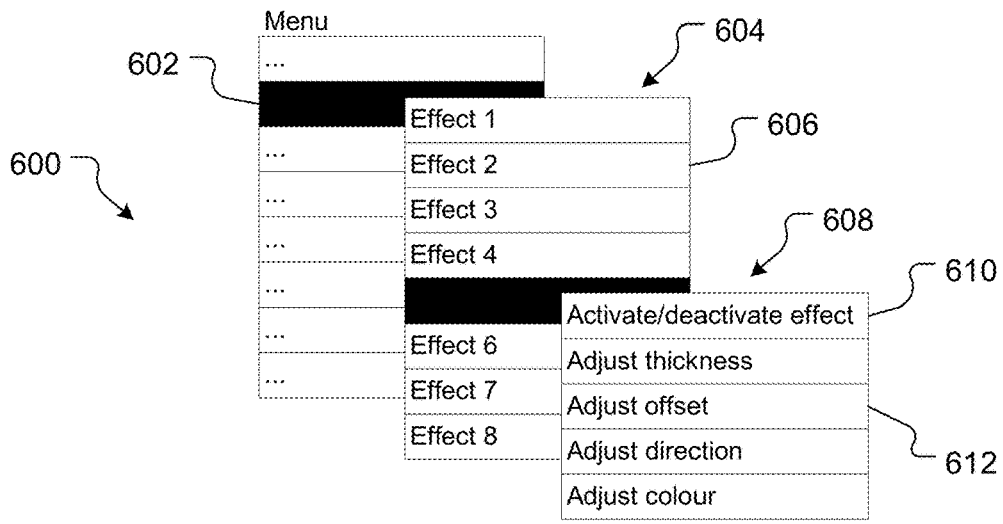

FIGS. 4 and 5 depict a particular example of an effect interface 400. Alternative user interface elements can, however, be provided in order to activate effects, de-activate effects, and/or adjust effect parameters. As an alternative example, FIG. 6 depicts a user interface 600 which allows for effects to be activated/de-activated and for parameters to be adjusted via a drop-down menu mechanism.

User interface 600 includes an effects menu item 602. Effects menu item 602 is similar to effects control 330 of interface 300 above.

Activation of the effects menu item causes an effects sub-menu menu 604 to be displayed, the effects menu including effect menu items 606 for each effect that can be activated. Selection of a particular effect menu item 606 causes a specific effect sub-menu 608 to be displayed which includes: an activation/deactivation control 610 which toggles the specific effect on/off, and (where relevant to the particular effect in question) one or more parameter controls 612. Selection of a given parameter causes a parameter adjustment control to be displayed (such as a slider bar or alternative control as described above).

This section describes processing involved in order to apply an effect to a selected design element.

Certain operations are described as being performed by the effect component 114. As noted above, the EC 114 in the present embodiment is installed on a client system (such as 110). The EC 114 could, however, be installed on a server system such as 102, in which case communication between the client application 112 and sever application 104 will be required.

Figure 7:
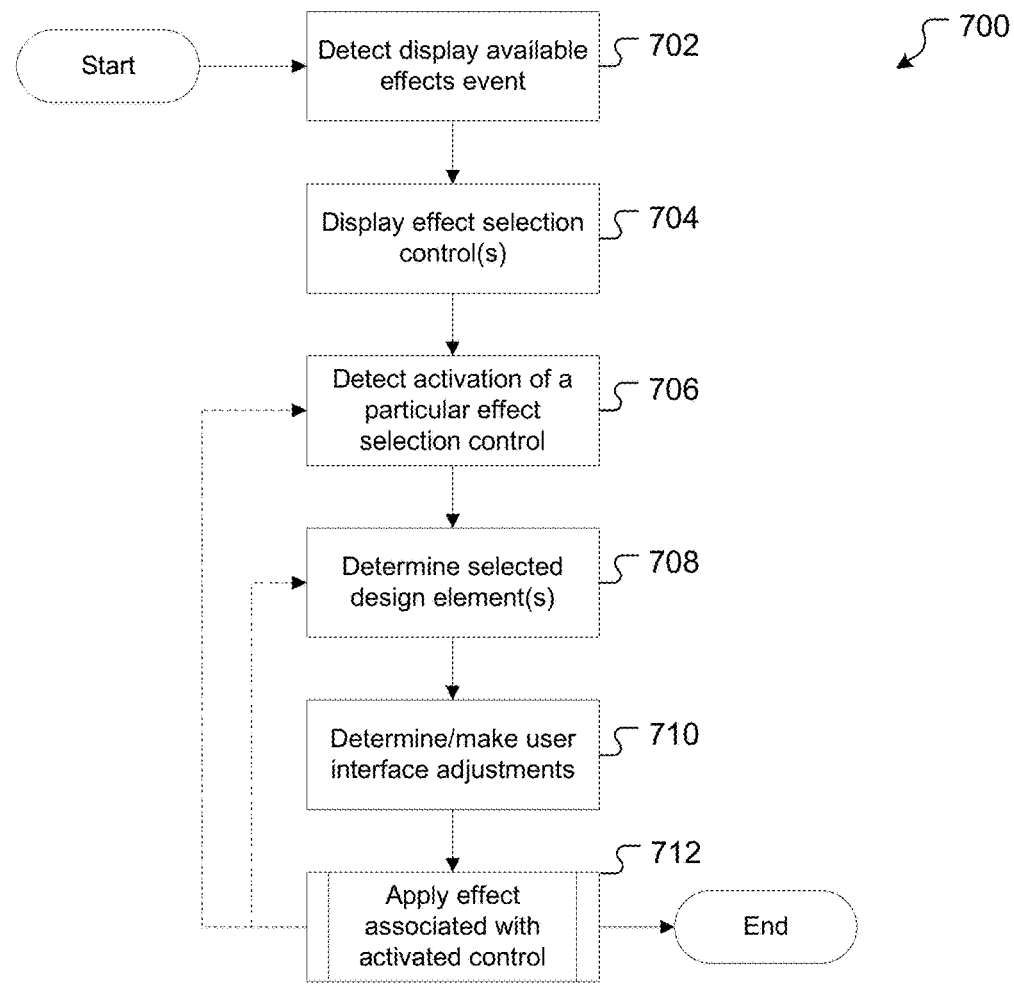
FIG. 7 is a flowchart depicting operations involved applying an effect to a selected design element.
Figure 8:
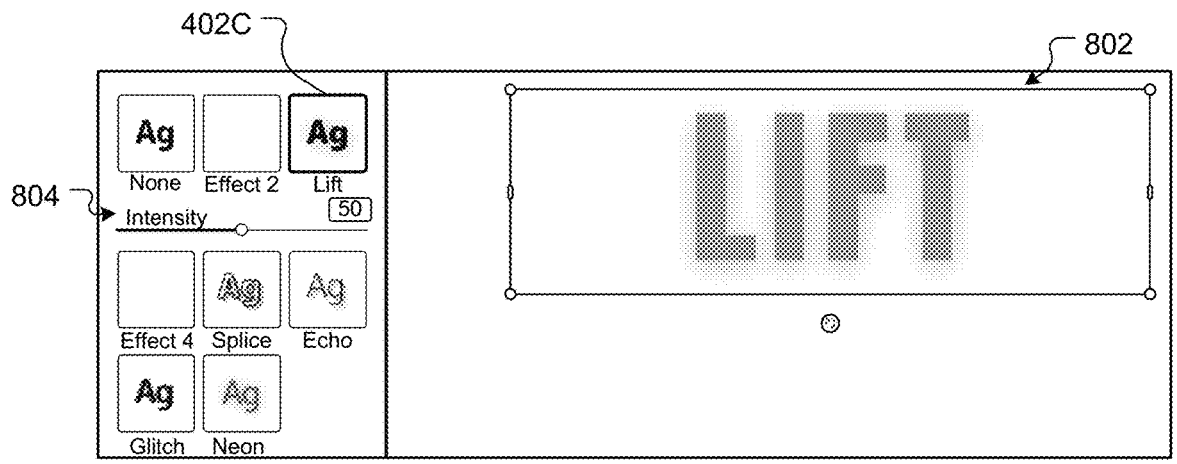
FIGS. 8 to 13 provide example effect interfaces and effects.
Figure 9:
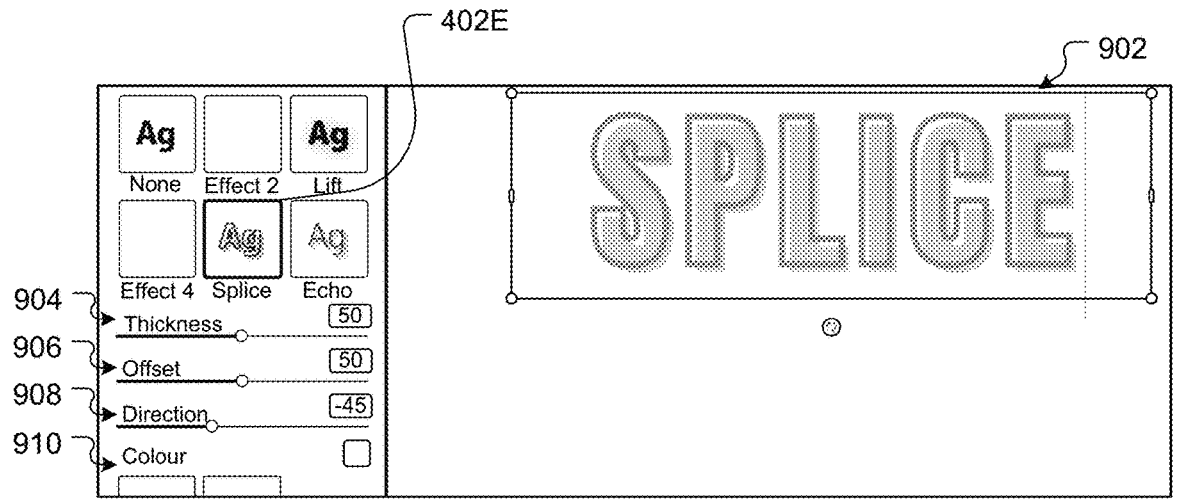
Figure 10:
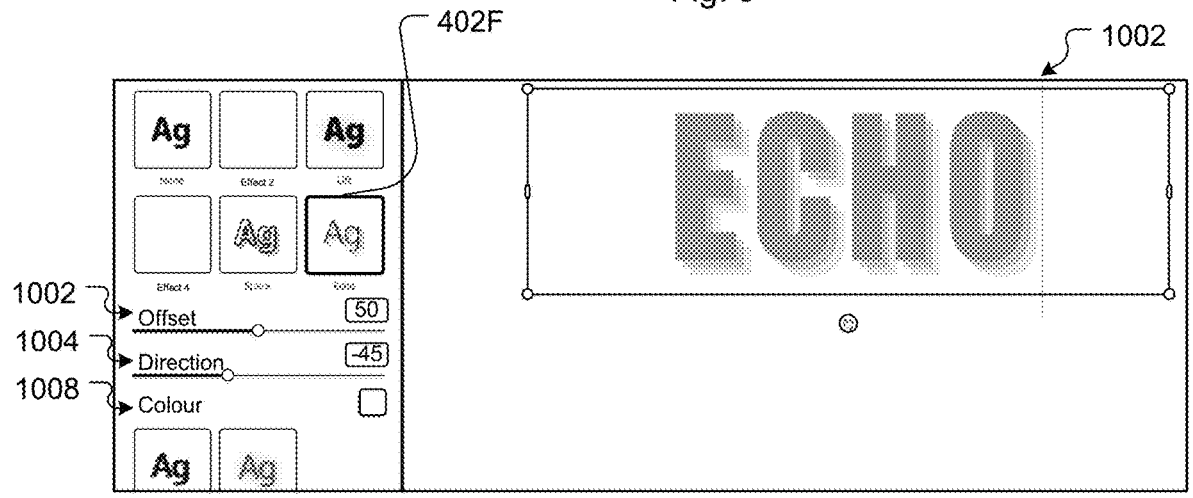

FIG. 7 is a flowchart depicting operations involved in selecting and applying an effect to one or more design elements.

At 702, the client application 112 detects a display available effects event. Initially this event is detected by the client application, for example by detecting user activation of an effects control. Any appropriate effects control may be provided, such as effects control 330 of interface 300, effects control 602 of menu interface 600, or an alternative user interface control.

At 704, in response to detecting the display available effects event, the client application 112 displays one or more effect selection controls. Each effect selection control is associated with a particular effect. The one or more effect selection controls may be displayed, for example, in a user interface such as effects interface 400 (with effect selection controls 402), a menu such as sub-menu 604 described above (with effect activation/deactivation controls 610), or in an alternative manner.

At 706, the client application 112 detects activation of a particular effect selection control.

At 708, the client application 112 determines any design element or elements that have been selected. User input selecting one or more design elements may be received prior to detection of the display available effects event, prior to activation of the particular effect selection control, or after activation of a particular effect selection control (in which case the activated effect is, if possible, applied to the post-selected element(s)).

If no design element has been selected, the client application 112 may be configured to display an error message (e.g. a pop-up box or the like) indicating that no design element has been selected.

Where the effect associated with the activated effect selection control can only be applied to design elements of certain types (e.g. vector fonts, vector elements, or other types of elements), the client application 112 determines whether the type(s) of the selected design element(s) is or are suitable for the activated effect. If the effect associated with the activated effect selection control cannot be applied to the selected design element(s), the client application 112 may be configured to display an error message (e.g. a pop-up box or the like) indicating this.

At 710, the client application 112 determines any user interface adjustments that are required and makes those adjustments. This may involve the EC 114 determining if any user adjustable parameters are associated with the activated effect. Example user interface adjustments the client application may be configured to make are as follows.

As one example, the client application 112 may cause the activated effect selection control to be displayed in a way that distinguishes it over non-activated effect selection controls. One example of this is described above where selection of control 402E caused it to be visually distinguished via visual distinction 404 (in that example an emphasised bounding box).

As another example, where activating one particular effect causes the appearance of a previously activated effect selection control to change to indicate it is now de-activated. An example of this is also provided above: in FIG. 4, control 402A is selected a displayed with a distinct border 404. In FIG. 5, a user has activated control 402E causing the border of control 402A to resume a normal, non-activated appearance (in this particular example a standard border).

As another example, where the effect associated with the activated control has user-adjustable parameters, the client application 112 causes parameter controls to be displayed (such as parameter controls 502, 504, 506, and 508 described above).

As a further example, where parameter controls are displayed the client application 112 may adjust other effect selection controls to provide space for the parameter controls. An example of this is described above with respect to FIG. 5, where effect selection controls 402G and 402H are moved to allow space for parameter controls 502, 504, 506, and 508 to be displayed.

At 712, the client application 112 applies the activated effect (detected at 706) to the selected design element(s) (determined at 708). To do so, the client application 112 invokes the functionality provided by the EC 114. If the activated effect has one or more user-adjustable parameters, and user input adjusting any of those parameters is detected by the client application 112, the client application 112 also causes those adjustments to be made.

The processing performed to apply (and if required adjust) a particular effect depends on the effect in question and is described in further detail below.

After the activated effect has been applied (and any/all parameter adjustments made) process 700 ends. At this point a user may elect to: apply an alternative effect to the selected design element(s), in which case processing can return to 706; undo the effect (e.g. via an 'undo' control) or selecting a 'no effect' type control, in which case processing can return to 706; selecting one or more new design elements to apply an effect to, in which case processing can return to 708; or otherwise exit the effects mode (which may cause the effect selection controls 704 to be removed from display, potentially to be replaced with alternative controls).

The processing involved in applying different effects to a particular design element—for example a selected design element as determined at 708 above—will now be described. The design element to which the effect is being applied will be referred to as the subject element.

Where an effect is applied to more than one design element (e.g. multiple elements are determined to be selected at 708), the processing described is performed with respect to each design element.

In addition to describing the processing performed to apply each effect, an example user interface is also provided to depict an example of the effect as applied to a design element. In each example user interface the design element is text (i.e. a string of letters), however the processing performed to apply the effect could be performed (or be adapted to be performed) for alternative types of design elements.

To calculate various effect attributes, scaled pixels (Spx) is used as a unit of distance. Spx are similar to pixels (px) but are dependent on various parameters that impact the physical size of an element as displayed on a display or printed—for example an element's size (e.g. font size), an element zoom level, zoom level of the page on which the element is displayed, etc.

Accordingly, spx is used in order to maintain a 'normalised' size relative to the subject element (e.g. the glyphs of the text for a text element).

In the context of text elements, and by way of example, 1 spx is equal to 1 px at 12 pt font, 100% zoom. If the font size is increased to 24 pt, then 1 spx for that text element would end up being 2 px. Accordingly, for a reference text element at 12 pt, 100% zoom, spx and px can be treated as being the same.

The 'No effect' effect is not actually an effect per se. Rather it causes no effect to be applied to the subject element.

Where activation of the 'no effect' effect selection control 402A is detected (e.g. at 706), the EC 114 removes any effect applied to the subject element—i.e. returning the subject element to its 'normal' appearance.

In the example described above, the 'no effect' effect selection control 402A is activated by default when the effect selection controls are displayed at 704.

Where activation of the 'lift' effect selection control (402C in this example) is detected (e.g. at 706), the EC 114 applies a blurred shadow effect that gives the impression that the subject element is being 'lifted from the page. An example of the 'lift' effect is depicted with the text 'Lift' 802 in FIG. 8.

The EC 114 generates the 'lift' effect by creating a black shadow for the subject design element (e.g. a text shadow) and manipulating a combination of blur radius and opacity properties to provide the appearance of the subject element being 'lifted off' a surface.

In the present embodiments, a single parameter is used to generate the 'lift' effect: a lift intensity value i ($0<=i<=1$).

In some implementations, the intensity value i is a predefined, constant value. In this case, and with the equations discussed below, the inventors have identified that a predefined constant value of i=0.5 is appropriate (which, using the equations below, provides a shadow blur radius of 2.55 spx and a shadow opacity of 0.325 spx).

In alternative implementations, and as discussed below, the EC 114 provides intensity as a user-adjustable parameter. In this case, the predefined initial/default value of the intensity parameter (i.e. the value of the intensity parameter when the 'neon' effect is initially applied and without any user interaction) is i=0.5.

The EC 114 calculates a blur radius for the shadow by linear interpolation between a minimum blur radius value (BRmin) and a maximum blur radius value (BRmax) by intensity i. E.g.:

$$\text{shadow blur radius} = BR\,min + ((BR\,max - BR\,min) * i)$$

The inventors have identified that a minimum blur radius (minBR) of 0.6 spx and a maximum blur radius (maxBR) of 4.5 spx serve to generate an aesthetically pleasing 'lift' effect (or, conversely, prevent an effect being generated that does not actually provide the desired 'lift' appearance). In this case, where i=0.5 (e.g. the default value in the present embodiment), the blur radius r would be 2.55 spx.

Alternative minBR and maxBR values can be used—e.g. a minBR of approximately 0.6 spx.

The EC 114 calculates opacity for the shadow by linear interpolation between a minimum opacity value (min O) and a maximum opacity value (maxO) by intensity i. E.g.:

$$\text{shadow opacity} = \min O + ((\max O - \min O) * i)$$

The inventors have identified that a minimum opacity (min O) of 0.05 spx and a maximum opacity (maxO) of 0.6 spx serve to generate the 'lift' effect (or, conversely, prevent an effect being generated that does not actually provide the desired 'lift' appearance). In this case, for example, if i was 0.5, the opacity would be 0.325 spx.

Alternative min O and maxO values can be used—e.g. a min O of approximately 0.05 spx.

The shadow for the 'lift' effect is created with an offset of 0 (and, if required, a direction of 0—though with no offset the direction not relevant).

The manner in which a shadow can be generated is described further below.

As noted above, in certain implementations the EC 114 provides intensity as a user adjustable parameter. In this case, the value of the intensity parameter i is selectable/adjustable by a user via an intensity parameter slider control 804 allowing selection of a value between 0 and 1 (or selection of a display value that maps to a value of between 0 and 1).

Where activation of the 'splice' effect selection control (402E in this example) is detected (e.g. at 706), the EC 114 applies an effect involving a hollowed outline of the subject element as well as a shadow behind the subject element. As the element is 'hollow' the shadow can be see both outside and inside the outline. An example of the 'splice' effect is depicted with the text 'Splice' 902 in FIG. 9.

The EC 114 generates the 'splice' effect by adjusting the subject element to have an outline that takes the source colour of the element (e.g. the source text colour). The EC 114 generates the shadow colour to have a default colour that is a tint of the source colour of the element.

Accordingly, generation of the 'splice' effect involves two aspects: outline generation and shadow generation.

To generate the outline, the EC 114 sets the subject element fill to transparent and applies a stroke colour to the subject element (e.g. a text-stroke) which is the same colour as the subject element. The EC 114 sets a default width/thickness to the stroke (outline) of 0.6 spx.

Applying an outline to an element is discussed below.

To generate the shadow, the EC 114 applies a shadow to the subject element (causing display of the shadow).

The EC 114 sets a default offset of 1 spx and a default shadow direction of −45 degrees.

In the present implementation, an angle of 0 degrees is directly to the right with positive values tracking in an anti-clockwise direction and negative values moving in a clockwise direction. Accordingly, an angle of −45 degrees (or 315 degrees) positions a shadow below and to the right of the element outline.

The EC 114 generates a default colour for the drop shadow colour to be a lighter version of the original subject element colour. To do this, the EC 114 initially converts the original subject element colour into the HSV (hue saturation value) colour space. The EC 114 then determines a new HSV colour by as follows.

The EC 114 sets the hue for the shadow colour to be the same as the hue of the original colour.

The EC 114 calculates the saturation for the shadow colour to be half (or approximately half) the saturation of the original colour.

The EC 114 calculates the value for the shadow colour by linear interpolation of the value of the original colour to 1 with a ratio of 0.5 (or, on other words, new value=average(1, original colour value)).

For example, if the original colour was hsv(0, 0.6, 0.6), the new colour for the shadow would be hsv(0, 0.3, 0.8).

In the present example, once the shadow colour has been calculated, the EC converts the shadow's HSV colour back into a RGB colour (or rgba colour) in order to apply the shadow to the subject element.

In certain implementations, the EC 114 provides a number of user adjustable parameters which allow a user to adjust the appearance of the 'splice' effect. In this particular example the EC 114 provides the following user-adjustable parameters.

A thickness parameter (adjustable via a slider control 904), operable to adjust the thickness of the outline. The EC 114 sets minimum and maximum thickness bounds of 0.1 and 1. Accordingly, the EC 114 converts a user-selected value (e.g. the 'display' value) to an actual thickness value of between 0.1 spx and 1 spx (i.e. 0.1<=thickness<=1). As noted above, when the 'splice' effect is initially applied the EC 114 sets a default thickness value of 0.6 spx.

An offset parameter (adjustable via a slider control 906), operable to adjust the offset of the shadow. The EC 114 sets minimum and maximum offset bounds of 0 and 2. Accordingly, the EC 114 converts a user-selected value (e.g. the 'display' value) to an actual offset value of between 0 spx and 2 spx (i.e. 0<=offset<=2). As noted above, when the 'splice' effect is initially applied the EC 114 sets a default offset value of −1 spx.

A direction parameter (adjustable via a slider control 908), operable to adjust the direction of the shadow. Any direction can be selected—e.g. within a range of −180 degrees to +180 degrees (or 0 to 360 degrees). As noted above, when the 'splice' effect is initially applied the EC 114 sets a default direction of −45 degrees.

A colour parameter (adjustable via a selection control 910), operable to adjust the colour of the effect. In this case, adjusting the colour adjusts the colour of shadow (the colour of the outline being adjustable via a normal colour adjustment control associated with the subject element—e.g. a font colour control in the case of a text element). Calculation of a default shadow colour that is appropriate for the original colour of the element is described above.

Where activation of the 'echo' effect selection control (402F in this example) is detected (e.g. at 706), the EC 114 applies an effect involving multiple shadows beneath the subject element. An example of the 'echo' effect with two shadows is depicted with the text 'Echo' 1002 in FIG. 10.

The EC 114 generates the 'echo' effect by adding at least two shadows beneath the subject element. The EC 114 generates (and displays) the shadows to be the source colour (i.e. the colour of the subject element) and to be progressively more transparent (less opaque) and progressively more offset/distant from the subject element.

In one implementation, the EC 114 generates the 'echo' effect to include the subject element and two shadows: a first shadow immediately beneath the original element and a second shadow beneath the first shadow.

The EC 114 generates (and displays) the first shadow to have: an offset of 1 spx; a direction of −45 degrees; the colour of the subject element; and an opacity of 50% (0.5).

The EC 114 generates (and displays) the second shadow to have: an offset of twice the first shadows offset (e.g. 2 spx as default); a direction of −45 degrees (the same as the first shadow's default); the colour of the subject element; and an opacity of 30% (0.3).

If the EC 114 is configured to generate (and display) more than two shadows in applying an 'echo' effect, the EC 114 generates each successive shadow (from foreground to background) to have an increasing offset and a decreasing opacity value compared to the previous shadow.

In certain implementations, the EC 114 provides a number of user adjustable parameters which allow a user to adjust the appearance of the 'echo' effect. In this particular example the EC 114 provides the following user-adjustable parameters.

An offset parameter (adjustable via a slider control 1004), operable to adjust the offset of the shadows. The EC 114 sets minimum and maximum offset bounds of 0.02 and 2. Accordingly, the EC 114 converts a user-selected value (e.g. the 'display' value) to an actual value of between 0.02 spx and 2 spx (i.e. 0.02<=offset<=2). The specific offset value calculated from the user-selected value is used as the offset for the first shadow. The offset for the second shadow is then calculated as 2× the offset value of the first shadow. As noted above, when the 'echo' effect is initially applied the EC 114 sets a default offset value of 1 spx (leading to first and second shadow offsets being 1 spx and 2 spx respectively).

A direction parameter (adjustable via a slider control 1006), operable to adjust the direction of the shadow. Any direction can be selected—e.g. within a range of −180 degrees to +180 degrees. As noted above, when the 'echo' effect is initially applied the EC 114 sets a default direction of −45 degrees.

A colour parameter (adjustable via a selection control 1008), operable to adjust the colour of the effect. In this case, adjusting the colour adjusts the colour of the shadows (the opacity remaining as defined above). The colour of the subject element itself is adjustable via a normal colour adjustment control associated therewith.

In certain implementations, the EC 114 also provides a user-adjustable parameter to adjust the number of 'echoes' (i.e. the number of shadows). This could, for example, be a counter type interface allowing the user to adjust the number of shadows from 2 (default) to a maximum number of shadows x (e.g. x=5, x=10, or another maximum number). Where a user adjusts the number of shadows to n, the EC 114 generates n shadows. Per above each shadow is generated to have the source colour of the element and a default direction of −45. For each shadow the EC 114 then calculates an opacity and an offset.

Shadow opacities are calculated so the shadows are increasingly transparent from foreground to background. This can be done in various ways. As one example, a decay function is used whereby the opacity for the first shadow is set at x % and the shadow for each subsequent shadow is set at y % of the opacity of the previous shadow. For example, if x was 50% and y was 66% and there were 5 shadows, their respective opacities would be: 50%, 33.3%, 22.2%, 14.8%, and 9.9%.

Shadow offsets are calculated so the shadows are increasingly offset from the original element. This can be done in various ways. As one example, the EC 114 successively offsets each shadow by a constant offset value—e.g. the offset for shadow i=(i*offset constant). For example, if the offset constant was 1 spx, and there were 5 shadows, the EC 114 would calculate their respective offsets to be: 1 spx, 2 spx, 3 spx, 4 spx, and 5 spx respectively. Where offset is provided as a user-adjustable parameter, the user-selected offset value may be the offset constant.

Where activation of the 'glitch' effect selection control (402G in this example) is detected (e.g. at 706), the EC 114 applies an effect that displays a different colour to either side of the subject element to give the appearance of a digital 'glitch'.

Figure 11:
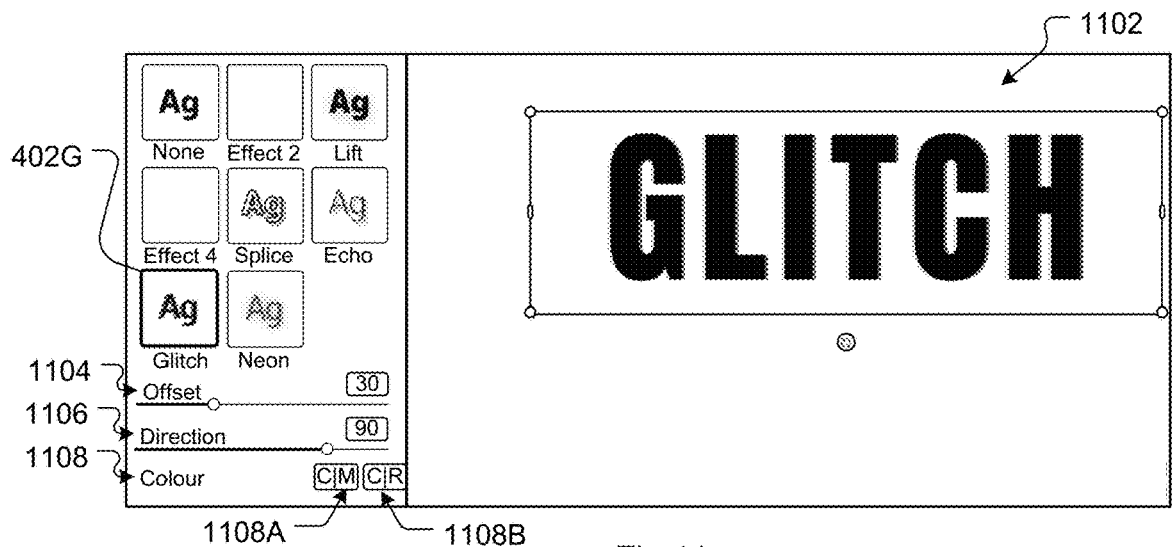
Figure 12:
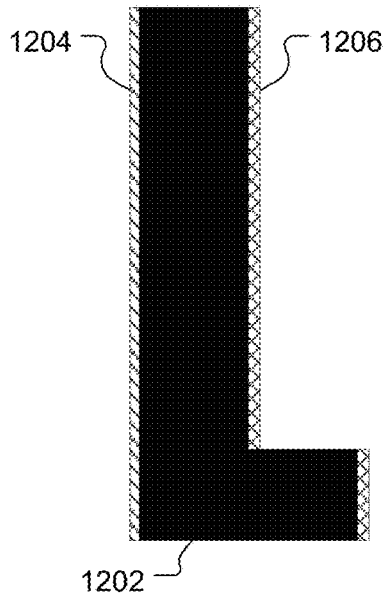
Figure 13:
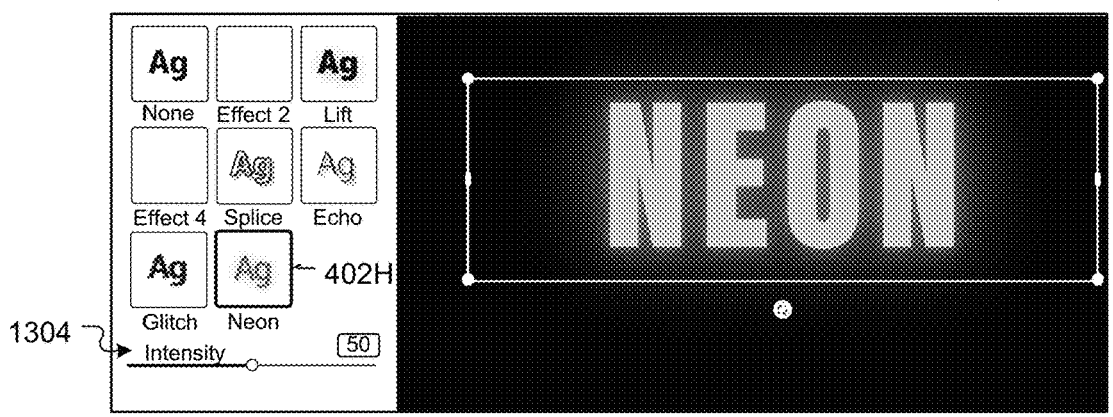

An example of the 'glitch' effect is depicted with the text 'Glitch' 1102 in FIG. 11. To further illustrate the effect, FIG. 12 provides an example letter 'L' 1202 and uses two distinct pattern fills 1204 and 1206 to represent the two different colours.

In the present embodiments, the 'glitch' effect is generated to give the appearance of real world glitches such as chromatic aberrations and RGB shifts.

The EC 114 generates the 'glitch' effect by adding two shadows (e.g. a first shadow 1204 and a second shadow 1206) to the element being adjusted. The two shadows are rotated 180 degrees away from each other and provided with default colours.

In the presently described implementation, two different glitch effects can be generated: one in which the two shadow colours are cyan and magenta (in this case the default colour scheme) and one in which the two shadow colours are cyan and red.

In the present embodiment, the default direction of the first shadow (e.g. 1204) is directly to the left of the element (e.g. 180 degrees) and the default direction of the second shadow (e.g. 1206) is rotated 180 degrees from the first shadow—making it in this case directly to the right of the element (e.g. 0 degrees).

In the present embodiment, the default offset for both the first and second shadows is 0.3 spx.

In certain implementations, the EC 114 provides a number of user adjustable parameters which allow a user to adjust the appearance of the 'glitch' effect. In this particular example the EC 114 provides the following user-adjustable parameters.

An offset parameter (adjustable via a slider control 1104), operable to adjust the offsets of the two shadows. The EC 114 sets minimum and maximum offset bounds of 0 and 1. Accordingly, the EC 114 converts a user-selected value (e.g. the 'display' value) to an actual offset value of between 0.01 spx and 1 spx (i.e. 0.01<=offset<=1), which is then applied to both shadows. As noted above, when the 'glitch' effect is initially applied the EC 114 sets default offset values of 0.3 for the first and second shadows.

A direction parameter (adjustable via a slider control 1106), operable to adjust the directions of the two shadows. Any direction can be selected—e.g. within a range of −180 degrees to +180 degrees. When a direction is input by a user, the EC 114 applies the user input direction to one of the shadows (e.g. the first shadow 1204) and calculates the direction of the other shadow (e.g. the second shadow 1206) to be 180 degrees from the input direction. As noted above, when the 'glitch' effect is initially applied the EC 114 sets a default direction of 180 degrees.

A colour parameter (adjustable via a selection control 1108), operable to adjust the colour of the effect. In this case, two separate colour controls are provided: a first colour control 1108A selectable to create a first 'glitch' effect (e.g. in which the colours are cyan and magenta) and a second colour control 1108B selectable to instead apply a second 'glitch' effect (e.g. in which the colours are cyan and red). The colour of the subject element itself is adjustable via a normal colour adjustment control associated therewith.

Where activation of the 'neon' effect selection control (402C in this example) is detected (e.g. at 706), the EC 114 applies a glow effect that gives the impression that the subject element is provided by a neon light (e.g. that the element is a neon sign). An example of the 'neon' effect is depicted with the text 'Neon' 1302 in FIG. 13 (though, again, illustrating in grey scale is difficult).

The EC 114 generates the 'neon' effect by adjusting the fill colour of the element and creating a shadow.

In the present embodiments, two parameters are used to generate the 'neon' effect: the original colour (e.g. fill colour) of the element to which the effect is being applied and an intensity value i (0<=i<=1).

In some implementations, the intensity value i is a predefined, constant value. In this case, and with the equations discussed below, the inventors have identified that a predefined constant value of i=0.5 is appropriate.

In alternative implementations, and as discussed below, the EC 114 provides intensity as a user-adjustable parameter. In this case, the predefined initial/default value of the intensity parameter (i.e. the value of the intensity parameter when the 'neon' effect is initially applied and without any user interaction) is i=0.5.

To adjust the fill colour of the element, the EC 114 initially converts the original element colour to the HSV colour space. The EC 114 then calculates a new fill colour as follows:

The EC 114 sets the hue for the new fill colour to be the same as the hue of the original colour.

The EC 114 calculates the saturation for the new fill colour by linearly interpolating the original saturation towards 0, based on the intensity i. E.g.:

$$\text{new fillSaturation} = \text{original saturation} - (\text{original saturation} * i)$$

The EC 114 calculates the value for the new fill colour by logarithmically interpolating the original value towards 1 based on the intensity i, using the formula:

$$\text{new fillValue} = \text{oldValue} + (1 - \text{oldValue}) * \text{Math·log}(\text{Math·pow}(i, 0.7) + 1) / \text{Math·log}(2))$$

In the present example, once the new colour has been calculated, the EC converts the HSV fill colour back into a RGB colour to be applied to the subject element.

To generate and display the shadow, the EC 114 applies a shadow to the element which has an offset of 0 (and a direction of 0, though with a 0 offset direction is unimportant).

To generate the shadow colour, the EC 114 initially converts the original element colour into the HSV colour space. The EC 114 then calculates a shadow colour as follows.

The EC 114 sets the hue for the shadow colour to be the same as the hue of the original colour.

If the original colour saturation is below a threshold saturation (e.g. 0.1 or approximately 0.1), the EC 114 sets the shadow saturation to 0. If the original colour saturation is greater than or equal to 0.1, the EC 114 calculates the shadow saturation by linearly interpolating the original saturation between 0.2 (a minimum saturation) and 1 (a maximum saturation) based on the saturation of the original text colour. E.g.:

```
if (originalSaturation < 0.1)
    shadowSaturation = 0
else
    shadowSaturation = 0.2 + (0.8 * originalSaturation)
```

While the inventors have identified that a threshold saturation of 0.1 (or approximately 0.1), a minimum saturation of 0.2 (or approximately 0.2), and a maximum saturation of 1 (or approximately 1) produce a shadow saturation that produces an effective 'neon' effect, alternative values and equations may be possible.

The EC 114 calculates the value for the new colour by linearly interpolating between 0.2 (a minimum Value) and 1 (a maximum Value) based on the original colour value. E.g.:

$$shadowValue = value = 0.2 + (0.8 * originalValue)$$

While the inventors have identified that a minimum Value of 0.2 (or approximately 0.2) and a maximum Value of 1 (or approximately 1) produce a shadow Value that produces an effective 'neon' effect, alternative values and equations may be possible.

In the present example, once the shadow colour has been calculated, the EC converts the shadow's HSV colour back into a RGB colour in order to apply the shadow to the subject element.

As noted above, in certain implementations the EC 114 provides intensity as a user adjustable parameter. In this case, the value of the intensity parameter i is selectable/adjustable by a user via an intensity parameter slider control 1304 (similar in operation to parameter control 502 of FIG. 5).

In alternative embodiments, rather than using shadows to generate a glitch effect the EC 114 is configured to generate a glitch effect by blending two elements. In other words, the glitch effect is rendered as two elements with the desired colours (e.g. a red version of the element and a cyan version of the element), overlaid on top of each other (slightly offset) with a multiply or screen blend mode. Where the two elements overlap, their two colours create black. Where they do not, the element colour is visible. More specifically, the "multiply" blend mode affects overlapping pixels, and multiplies the colours together (resulting in a darker pixel, since each pixel is between 0 and 1). Since red and cyan are defined as rgb(1,0,0) and rgb(0,0,1), when multiplied together they become rgb(0, 0, 0) or black.

Each of the effects described above is achieved (at least in part) by applying one or more shadows to a design element.

Various techniques for generating shadows (or shadow-like effects) are possible.

By way of example, in certain implementations the client application 112 (and or server application 104) are configured to create designs in a markup language such as XML or HTML. In this case, and for text-type design elements, shadows can be applied by use of cascading style sheets (CSS).

In particular the CSS text-shadow property can be used to add a shadow to a text element (by adding shadows to each letter/glyph thereof). Generally speaking, the text-shadow property allows one or more shadows to be defined (each shadow separated by a comma).

For each shadow, an x and y offset, blur radius, and colour can be defined.

For the CSS text-shadow property, x- and y-offset values are length values expressed in pixels. Accordingly, the EC 114 calculates x- and y-offset values based on the direction (expressed in the above examples as an angle) and distance—e.g. using trigonometric equations.

Once calculated, the x- and y-offsets can then be converted from scaled pixels to actual pixels based on the relevant parameters of the element and page (e.g. font size, element zoom level, page zoom level etc.).

Similarly, where a blur radius is applied (e.g. in the 'lift' effect) it too can be converted from spx to pixels based on the relevant element and page parameters.

As an example, therefore, a shadow generated by the lift effect described above may take the following form:
text-shadow: 0 0.2 px 0.7 px rgba(0, 0, 0, 0.325);
I.e. a shadow that has an x-offset of 0, a y-offset of 0.2 px, a blur radius of 0.7 px and a rgba colour of (0, 0, 0, 0.325).

As an alternative example, a shadow effect can also be generated by creating a duplicate of a text element with appropriate parameters and positioning that duplicate to create the required shadow effect.

The 'splice' effect described above also involves applying an outline.

This too can be achieved in various ways.

In certain implementations, however, the EC 114 creates an outline using another CSS rule to set an outline width and colour. E.g.:
-webkit-text-stroke: 3 px red;
This creates a read outline 3 pixels wide.

Alternatively, an outline can be applied by the SVG CSS stroke-*rules.

It will be appreciated that the EC 114 is configured to generate each of the effects described above automatically and without any user input (other than input to select the effect).

From a user perspective, this provides a far simpler interaction and improved user experience. It unburdens the user of the need to determine which particular parameter(s) of the large number available should be adjusted to create a given effect and, once those parameters have been determined, what parameter values should be chosen.

As the desired effect get more complicated (e.g. per the above described effects), the number of parameters that can or should be adjusted increases exacerbating this issue.

Aside from the user experience, automatically generating complex effects as described can also reduce the amount of processing ultimately required. In order to generate an effect, a user may make multiple small, progressive changes to various parameters in order to reach the desired endpoint—e.g. the user may experiment by making multiple adjustments to shadow angle, shadow colour, shadow opacity, shadow distance, and/or other parameters. Each parameter adjustment that is made in such experimentation consumes processor resources.

By automatically generating complex effects as described, the need for a user to experiment in this way is removed (or at least reduced), thus saving the processing that would otherwise be involved in such experimentation.

The improved user interface, user experience, and use of computational resources is also present in embodiments where the EC 114 provides a given effect with one or more user-adjustable parameters. In these embodiments, the EC 114 limits user experimentation to certain, specific parameters that are relevant to the effect in question. Furthermore, in some cases the EC 114 limits/provides bounds to values that can be chosen for a given parameter so the user cannot choose parameter values that would destroy or significantly impair the desired effect.

Additional specific embodiments of the present disclosure are described in the following numbered clauses.

Clause 1. A computer implemented method comprising: displaying a plurality of effect selection controls; detecting activation of a particular effect selection control; determining a selected design element, the selected design element being a text element; and automatically applying the particular effect to the selected design element without requiring further user input.

Clause 2. The computer implemented method of clause 1, wherein the particular is a 'lift' effect, and wherein automatically applying the 'lift' effect comprises: generating a shadow for the selected design element, the shadow having a default shadow colour, a default shadow blur radius, and a default shadow opacity.

Clause 3. The computer implemented method of clause 2, wherein the default shadow colour is black.

Clause 4. The computer implemented method of clause 2 or clause 3, wherein: the 'lift' effect is associated with a lift intensity value; the shadow blur radius is linearly interpolated between 0.6 spx and 4.5 spx inclusive by the lift intensity value; and the shadow opacity is linearly interpolated between 0.05 spx and 0.6 spx inclusive by the lift intensity value.

Clause 5. The computer implemented method of clause 4, wherein a default lift intensity value is 0.5.

Clause 6. The computer implemented method of clause 4 or clause 5, wherein: the lift intensity value is user adjustable; after automatically applying the 'lift' effect to the selected design element, user input selecting an new lift intensity value is received; and in response to receiving the user input selecting the new intensity value, the shadow blur radius and shadow opacity are adjusted according to the new intensity value.

Clause 7. The computer implemented method of clause 1, wherein the particular is a 'splice' effect, and wherein automatically applying the 'splice' effect comprises: applying a stroke to the selected design element, the stroke having a default stroke width and being an original colour of the selected design element; setting a fill of the selected design element to be transparent; generating a drop shadow for the selected design element, a colour of the shadow calculated be a tint of the original colour of the selected design element.

Clause 8. The computer implemented method of clause 7, wherein calculation of the shadow colour comprises converting the original colour into HSV colour space and calculating the shadow colour by: maintaining the original colour's hue; halving the original colour's saturation; linearly interpolating the original colour's value towards 1 with a ratio of 0.5.

Clause 9. The computer implemented method of clause 7 or clause 8, wherein the drop shadow is generated with a default direction of −45 degrees and a default offset of 1 spx.

Clause 10. The computer implemented method of clause 1, wherein the particular is an 'echo' effect, and wherein automatically applying the 'echo' effect comprises: generating a first shadow having a first direction, a first offset, and a first colour with a first opacity; and generating a second shadow having the first direction, a second offset that is greater than the first offset, and the first colour with a second opacity that is less than the first opacity.

Clause 11. The computer implemented method of clause 10, wherein first colour is an original colour of the selected design element.

Clause 12. The computer implemented method of clause 10 or clause 11, wherein the first direction is −45 degrees.

Clause 13. The computer implemented method of any one of clauses 10 to 12, wherein the second offset is twice the first offset.

Clause 14. The computer implemented method of clause 13, wherein first offset is 1 spx.

Clause 15. The computer implemented method of any one of clauses 10 to 14, wherein the first opacity is 50% and the second opacity is 30%.

Clause 16. The computer implemented method of clause 1, wherein the particular is a 'glitch' effect, and wherein automatically applying the 'glitch' effect comprises: generating a first shadow having a first colour, a first offset, and a first direction; and generating a second shadow having a second colour, the first offset, and a second direction, the second direction being opposite the first direction.

Clause 17. The computer implemented method of clause 16, wherein the first direction is 180 degrees and the second direction is 0 degrees.

Clause 18. The computer implemented method of clause 16 or clause 17, wherein the first offset is 0.3 spx.

Clause 19. The computer implemented method of any one of clauses 16 to 18, wherein the first colour is cyan and the second colour is red.

Clause 20. The computer implemented method of any one of clauses 16 to 18, wherein the first colour is cyan and the second colour is magenta.

Clause 21. The computer implemented method of clause 1, wherein the particular effect is a 'neon' effect, and wherein automatically applying the 'neon' effect comprises: generating a new fill colour for the selected element; generating a shadow for the selected design element, the shadow having a default shadow colour.

Clause 22. The computer implemented method of clause 21, wherein: the 'neon' effect is associated with a neon intensity value; and generating the new fill colour comprises: converting an original colour of the selected element into HSV colour space and calculating the new fill colour by: maintaining the original colour's hue; linearly interpolating the original colour's saturation towards 0 based on the neon intensity value; and logarithmically interpolating the original colour's value towards 1 based on the neon intensity value.

Clause 23. The computer implemented method of clause 21 or clause 22, wherein generating the default shadow colour comprises: converting an original colour of the selected element into HSV colour space and generating the new shadow colour by: maintaining the original colour's hue; linearly interpolating the original saturation between a minimum saturation and a maximum saturation inclusive based on the original colour's saturation; and linearly interpolating the original colour value between a minimum Value and a maximum Value based on the original colour's value.

Clause 24. The computer implemented method of clause 23, wherein the minimum saturation is 0.2 and the maximum saturation is 1.

Clause 25. The computer implemented method of clause 23 or clause 24, wherein the minimum Value is 0.2 and the maximum Value is 1.

Clause 26. The computer implemented method of any one of clauses 22 to 25, wherein: the neon intensity value is user adjustable; after automatically applying the 'neon' effect to the selected design element, user input selecting an new neon intensity value is received; and in response to receiving the user input selecting the new neon intensity value, the new fill colour is adjusted according to the new intensity value.

Clause 27. A computer processing system comprising: a processing unit; a display; and non-transient computer-readable storage medium storing instructions, which when executed by the processing unit, cause the processing unit to perform a method according to any one of clauses 1 to 26.

Clause 28. A non-transient storage medium storing instructions executable by a processing unit to cause the processing unit to perform a method according to any one of clauses 1 to 26.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless required by context, the terms "first", "second", etc. are used to differentiate between various elements and features and not in an ordinal sense. For example, a first effect selection control could be termed a second effect selection control, and, similarly, a second effect selection control could be termed a first effect selection control, without departing from the scope of the various described examples. By way of further example, in certain cases a second effect selection control could exist without a first effect selection control existing.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
displaying, on a display, a first text effect selection control in the form of a splice effect selection control;
detecting, via one or more processors, a first user input activating the first text effect selection control; and
in response to the first user input activating the first text effect selection control, imparting a splice effect by:
determining, via the one or more processors, a selected design element, the selected design element being a text element displayed on a page;
applying, via the one or more processors, a stroke to the selected design element;
setting, via the one or more processors, a fill of the selected design element to be transparent; and
generating, via the one or more processors, and displaying, via the display, a shadow for the selected design element.

2. The computer implemented method of claim 1, wherein:
the text element is associated with a text colour;
the method further includes generating a second colour based on the text colour;
applying the stroke to the selected design element includes setting a stroke colour of the stroke to the text colour; and
the shadow is generated to have a shadow colour that is the second colour.

3. The computer implemented method of claim 2, further comprising generating the second colour to be a tint of the text colour.

4. The computer implemented method of claim 2, wherein the text colour has a first hue, and wherein the method further comprises generating the second colour to have the first hue.

5. The computer implemented method of claim 2, wherein the text colour has a first hue and a first saturation, and wherein the method further comprises generating the second colour to have the first hue and a second saturation that is approximately half of the first saturation.

6. The computer implemented method of claim 1, wherein the shadow is generated to have a first offset and a first direction.

7. The computer implemented method of claim 6, wherein the first offset and the first direction position the shadow so it is offset from the stroke and at an angle of approximately 45 degrees from the stroke.

8. The computer implemented method of claim 1, wherein applying the stroke to the selected design element comprises applying the stroke to have a first stroke width, and wherein the method further comprises:
displaying a width adjustment control;
detecting second user input via the width adjustment control, the second user input selecting a first value; and
in response to the second user input:
determining a second stroke width based on the first value; and
applying the second stroke width to the selected design element.

9. The computer implemented method of claim 1, wherein generating and displaying the shadow for the selected design element comprises generating the shadow to have a first shadow offset, and wherein the method further comprises:
displaying an offset adjustment control;
detecting third user input via the offset adjustment control, the third user input selecting a second value; and
in response to the third user input:
determining a second shadow offset based on the second value; and changing display of the shadow from the first shadow offset to the second shadow offset.

10. The computer implemented method of claim 1, wherein generating and displaying the shadow for the selected design element comprises generating the shadow to have a first direction, and wherein the method further comprises:
  displaying a direction adjustment control;
  detecting fourth user input via the direction adjustment control, the fourth user input selecting a third value; and
  in response to the fourth user input:
    determining a second direction based on the third value; and
    changing display of the shadow from the first direction to the second direction.

11. The computer implemented method of claim 1, wherein generating and displaying the shadow for the selected design element comprises generating the shadow to have a first shadow colour, and wherein the method further comprises:
  displaying a colour adjustment control;
  detecting fifth user input via the shadow adjustment control, the fifth user input selecting a fourth value; and
  in response to the fifth user input:
    determining a second shadow colour based on the fourth value; and
    changing display of the shadow from the first shadow colour to the second shadow colour.

12. A computer processing system comprising:
  a processing unit;
  a display; and
  non-transient computer-readable storage medium storing instructions, which when executed by the processing unit, cause the processing unit to perform a method comprising:
    displaying a first text effect selection control on the display in the form of a splice effect selection control;
    detecting first user input activating the first text effect selection control; and
    in response to the first user input activating the first text effect selection control, imparting a splice effect by:
      determining a selected design element, the selected design element being a text element displayed on the display;
      applying a stroke to the selected design element;
      setting a fill of the selected design element to be transparent; and
      generating and displaying a shadow for the selected design element.

13. The computer processing system of claim 12, wherein:
  the text element is associated with a text colour;
  the method further includes generating a second colour based on the text colour;
  applying the stroke to the selected design element includes setting a stroke colour of the stroke to the text colour; and
  the shadow is generated to have a shadow colour that is the second colour.

14. The computer processing system of claim 13, wherein the method further comprises generating the second colour to be a tint of the text colour.

15. The computer processing system of claim 13, wherein the text colour has a first hue and a first saturation, and wherein the method further comprises generating the second colour to have the first hue and a second saturation that is approximately half of the first saturation.

16. The computer processing system of claim 12, wherein the shadow is generated to have a first offset and a first direction, and wherein the first offset and the first direction position the shadow so it is offset from the stroke and at an angle of approximately 45 degrees from the stroke.

17. The computer processing system of claim 12, wherein applying the stroke to the selected design element comprises applying the stroke to have a first stroke width, and wherein the method further comprises:
  displaying a width adjustment control;
  detecting second user input via the width adjustment control, the second user input selecting a first value; and
  in response to the second user input:
    determining a second stroke width based on the first value; and
    applying the second stroke width to the selected design element.

18. The computer processing system of claim 12, wherein generating and displaying the shadow for the selected design element comprises generating the shadow to have a first shadow offset, and wherein the method further comprises:
  displaying an offset adjustment control on the display;
  detecting third user input via the offset adjustment control, the third user input selecting a second value; and
  in response to the third user input:
    determining a second shadow offset based on the second value; and
    changing display of the shadow from the first shadow offset to the second shadow offset.

19. The computer processing system of claim 12, wherein generating and displaying the shadow for the selected design element comprises generating the shadow to have a first direction, and wherein the method further comprises:
  displaying a direction adjustment control on the display;
  detecting fourth user input via the direction adjustment control, the fourth user input selecting a third value; and
  in response to the fourth user input:
    determining a second direction based on the third value; and
    changing display of the shadow from the first direction to the second direction.

20. The computer processing system of claim 12, wherein generating and displaying the shadow for the selected design element comprises generating the shadow to have a first shadow colour, and wherein the method further comprises:
  displaying a colour adjustment control on the display;
  detecting fifth user input via the shadow adjustment control, the fifth user input selecting a fourth value; and
  in response to the fifth user input:
    determining a second shadow colour based on the fourth value; and
    changing display of the shadow from the first shadow colour to the second shadow colour.

* * * * *